(12) United States Patent
Brown et al.

(10) Patent No.: US 7,629,918 B2
(45) Date of Patent: Dec. 8, 2009

(54) MULTIFUNCTIONAL RADIO FREQUENCY DIRECTED ENERGY SYSTEM

(75) Inventors: Kenneth W. Brown, Yucaipa, CA (US); David J. Canich, Upland, CA (US); Russell F. Berg, Upland, CA (US)

(73) Assignee: Raytheon Company, Waltham, MA (US)

( * ) Notice: Subject to any disclaimer, the term of this patent is extended or adjusted under 35 U.S.C. 154(b) by 300 days.

(21) Appl. No.: 11/300,876

(22) Filed: Dec. 15, 2005

(65) Prior Publication Data

US 2007/0139247 A1 Jun. 21, 2007

(51) Int. Cl.
*G01S 13/66* (2006.01)
*G01S 7/38* (2006.01)

(52) U.S. Cl. .............................. 342/13; 342/67; 342/74; 342/90; 342/97; 89/1.11

(58) Field of Classification Search ............. 244/54–61, 244/3.11–3.3; 342/13, 67, 74, 54, 90, 43, 342/729, 61, 14
See application file for complete search history.

(56) References Cited

U.S. PATENT DOCUMENTS

| | | | | |
|---|---|---|---|---|
| 2,703,399 A | * | 3/1955 | Williams et. al. | 342/59 |
| 2,709,773 A | * | 5/1955 | Getting et. al. | 318/16 |
| 2,745,095 A | * | 5/1956 | Stoddard | 342/58 |
| 2,840,808 A | * | 6/1958 | Woodward | 342/163 |
| 2,908,870 A | * | 10/1959 | Hardin et al. | 331/87 |
| 3,417,700 A | * | 12/1968 | Furlani | 102/209 |
| 3,688,313 A | * | 8/1972 | Kern | 342/97 |
| 3,714,898 A | * | 2/1973 | Ziemba | 102/215 |
| 3,946,233 A | * | 3/1976 | Erben et al. | 250/347 |
| 4,004,487 A | * | 1/1977 | Eichweber | 89/1.815 |
| 4,035,799 A | * | 7/1977 | Hsiao | 342/162 |
| 4,109,883 A | * | 8/1978 | Korr et al. | 244/3.1 |
| 4,119,967 A | * | 10/1978 | Johnson et al. | 342/365 |
| 4,130,821 A | * | 12/1978 | Goldie | 342/198 |
| 4,214,534 A | * | 7/1980 | Richter et al. | 102/215 |
| 4,319,242 A | * | 3/1982 | Lewis | 342/67 |
| 4,360,812 A | * | 11/1982 | Peperone | 342/128 |
| 4,456,912 A | * | 6/1984 | Ensley | 342/13 |
| 4,661,819 A | * | 4/1987 | Lewis | 342/201 |

(Continued)

OTHER PUBLICATIONS

International Search Report for corresponding Application No. PCT/US2007/001831 dated Oct. 29, 2007.

*Primary Examiner*—Thomas H Tarcza
*Assistant Examiner*—Matthew M Barker
(74) *Attorney, Agent, or Firm*—Renner, Otto, Boisselle & Sklar, LLP

(57) ABSTRACT

An RFDE system includes an RFDE transmitter and at least one RFDE antenna. The RFDE transmitter and antenna direct high power electromagnetic energy towards a target sufficient to cause high energy damage or disruption of the target. The RFDE system further includes a targeting system for locating the target. The targeting system includes a radar transmitter and at least one radar antenna for transmitting and receiving electromagnetic energy to locate the target. The RFDE system also includes an antenna pointing system for aiming the at least one RFDE antenna at the target based on the location of the target as ascertained by the targeting system. Moreover, at least a portion of the radar transmitter or the at least one radar antenna is integrated within at least a portion of the RFDE transmitter or the at least one RFDE antenna.

22 Claims, 8 Drawing Sheets

U.S. PATENT DOCUMENTS

| | | | |
|---|---|---|---|
| 4,740,790 A * | 4/1988 | Hess et al. | 342/361 |
| 4,890,109 A * | 12/1989 | Gagliardi | 342/14 |
| 5,013,151 A * | 5/1991 | Hughes | 356/139.08 |
| 5,189,244 A * | 2/1993 | Weldon | 89/8 |
| 5,191,343 A * | 3/1993 | Danzer et al. | 342/21 |
| 5,387,917 A * | 2/1995 | Hager et al. | 342/68 |
| 5,389,931 A * | 2/1995 | Anderson et al. | 342/70 |
| 5,432,546 A * | 7/1995 | Cargill | 348/144 |
| 5,606,313 A * | 2/1997 | Allen et al. | 340/10.31 |
| 5,613,039 A * | 3/1997 | Wang et al. | 706/24 |
| 5,726,657 A * | 3/1998 | Pergande et al. | 342/202 |
| 5,747,720 A * | 5/1998 | Schnurr et al. | 89/1.11 |
| 5,777,572 A * | 7/1998 | Janusas | 342/13 |
| 5,780,839 A * | 7/1998 | Livingston | 250/203.2 |
| 5,838,262 A * | 11/1998 | Kershner et al. | 340/945 |
| 5,977,910 A * | 11/1999 | Matthews | 342/368 |
| 6,014,922 A * | 1/2000 | Livingston | 89/1.11 |
| 6,265,704 B1 * | 7/2001 | Livingston | 250/203.2 |
| 6,347,001 B1 | 2/2002 | Arnold et al. | |
| 6,396,577 B1 * | 5/2002 | Ramstack | 356/141.1 |
| 6,424,286 B1 * | 7/2002 | Smith et al. | 342/14 |
| 6,545,630 B1 * | 4/2003 | Apa et al. | 342/14 |
| 6,731,234 B1 * | 5/2004 | Hager et al. | 342/94 |
| 6,832,740 B1 * | 12/2004 | Ransom | 244/3.13 |
| 6,859,163 B2 * | 2/2005 | Alford et al. | 342/26 D |
| 6,872,960 B2 * | 3/2005 | Pepper et al. | 250/495.1 |
| 6,906,659 B1 * | 6/2005 | Ramstack | 342/54 |
| 6,967,614 B1 * | 11/2005 | Wardell et al. | 342/60 |
| 7,046,187 B2 * | 5/2006 | Fullerton et al. | 342/54 |
| 7,205,934 B2 * | 4/2007 | Hall | 342/175 |
| 7,212,148 B1 * | 5/2007 | Torres | 342/13 |
| 7,312,744 B1 * | 12/2007 | Ramstack | 342/54 |
| 2003/0016421 A1 * | 1/2003 | Small | 359/172 |
| 2004/0075884 A1 | 4/2004 | Byren et al. | |
| 2005/0012655 A1 * | 1/2005 | Lalezari et al. | 342/62 |
| 2005/0115385 A1 | 6/2005 | Rodriguez | |
| 2005/0115387 A1 * | 6/2005 | Smith et al. | 89/1.11 |
| 2006/0022115 A1 * | 2/2006 | Byren | 250/201.9 |
| 2006/0082488 A1 | 4/2006 | Keller, III | |
| 2006/0238199 A1 * | 10/2006 | Larsen | 324/329 |
| 2007/0040725 A1 * | 2/2007 | Lowell et al. | 342/13 |
| 2007/0051233 A1 * | 3/2007 | Duge | 89/1.13 |

\* cited by examiner

MULTIFUNCTIONAL RADIO FREQUENCY DIRECTED ENERGY SYSTEM

TECHNICAL FIELD

The present invention relates generally to radio frequency directed energy (RFDE) systems, and more particularly to multifunctional type RFDE systems.

BACKGROUND OF THE INVENTION

Radio frequency directed energy (RFDE) systems are known in the art for directing high power RF, microwave and/or millimeter wave electromagnetic energy to destroy or disrupt a target. Although RFDE systems typically serve as military weapons, RFDE systems need not be limited to weapon systems. For example, RFDE systems of the present invention may be used for non-military purposes such as destroying or disrupting foreign objects, contaminants, undesirable atmospheric conditions, or other types of targets.

As for weapon systems, it is important to distinguish between an RFDE weapon system and an electronic warfare system. A primary difference between an RFDE weapon and an electronic warfare system is power and kill mode. An electronic warfare system makes use of a priori knowledge of a target it is designed to jam or disrupt. An electronic warfare system uses such a priori knowledge of a target's characteristics (e.g., frequency of operation, method of operation, etc.) to disrupt or confuse the target with "finesse", or a relatively low amount of power.

On the other hand, an RFDE weapon system can go after a broad range of targets (electronics, biological, ordinance, structures, etc.) due to its relatively large radiated power. A priori knowledge of the intended target characteristics is typically not required because the RFDE weapon either burns-out or overwhelms its target by the shear amount of power it radiates.

An ongoing problem with RFDE systems is targeting—accurately pointing the RF directed energy beam at the intended target and establishing an accurate range from the system to the target. To date, the RFDE system targeting problem has been addressed by using what may be referred to as auxiliary add-on systems. These add-on systems could include a stand-alone radar system, a stand-alone laser range finder, stand-alone optical or infrared imaging system, etc. However, these add-on systems add significant cost to the RFDE system. In addition, these add-on systems add significant complexity by requiring calibration of the alignment between the RFDE system and the stand-alone targeting system.

FIG. 1 is a block diagram of a typical RFDE system 10. In its simplest form, the system 10 includes a high power transmitter 12 transmitting thru a high power antenna 14. The transmitter 12 operates at RF, microwave or millimeter wave frequencies. The system 10 operates based on a prime power source 16, such as an AC mains, generator, high capacity battery system, etc. A power conditioning block 18 conditions power delivered from the power source 16 so as to be suitable for powering the transmitter 12. A cooling system 20 provides appropriate cooling to the power conditioning block 18 and the high power transmitter 12 as needed. A control block 22 provides appropriate control among the various sub-systems.

The RFDE weapon system 10 further includes an antenna pointing system 24 for aiming the high power antenna 14, and thus the high power electromagnetic energy beam transmitted therefrom, at the target. The pointing system 24 typically is driven by coordinate data identifying the direction and range of the intended target. Such coordinate data is provided by a stand-alone targeting system 26. As is noted above, the targeting system 26 is an add-on often in the form of a stand-alone radar system, a stand-alone laser range finder, stand-alone optical or infrared imaging system, etc. As is also noted above, however, these add-on systems add significantly to the cost and complexity of the RFDE system.

In view of the aforementioned shortcomings associated with conventional RFDE systems, there is a strong need in the art for an RFDE system which is not subject to the cost and complexity associated with conventional targeting systems.

SUMMARY OF THE INVENTION

The RFDE system of the present invention eliminates the need for a separate, stand-alone targeting system by integrating a targeting system within the RFDE system itself. The RFDE system is multi-functional in that all or part of the RFDE system hardware that functions to direct high power electromagnetic energy also functions to obtain and provide targeting information to aim the high power electromagnetic energy beam. For example, the RFDE transmitter is not only used as the source of the directed electromagnetic energy, but is also used as a radar transmitter for targeting an object. A relatively simple radar receiver may then be added to the RFDE system. The cost of the overall system is substantially reduced since an expensive radar transmitter is not required. Moreover, the complexity of the system is reduced as calibration of the alignment between the RFDE system and a stand-alone targeting system becomes unnecessary.

According to one aspect of the invention, a multi-functional RFDE system is provided. The RFDE system includes an RFDE transmitter and at least one RFDE antenna. The RFDE transmitter and antenna direct high power electromagnetic energy towards a target sufficient to cause high energy damage or disruption of the target. The RFDE system further includes a targeting system for locating the target. The targeting system includes a radar transmitter and at least one radar antenna for transmitting and receiving electromagnetic energy to locate the target. The RFDE system also includes an antenna pointing system for aiming the at least one RFDE antenna at the target based on the location of the target as ascertained by the targeting system. Moreover, at least a portion of the radar transmitter or the at least one radar antenna is integrated within at least a portion of the RFDE transmitter or the at least one RFDE antenna.

According to another aspect of the invention, a method is provided operating an RFDE system. The method includes the steps of utilizing an RFDE transmitter and at least one RFDE antenna to direct high power electromagnetic energy towards a target sufficient to cause high energy damage or disruption of the target; utilizing a targeting system to locate the target, the targeting system including a radar transmitter and at least one radar antenna for transmitting and receiving electromagnetic energy to locate the target; aiming the at least one RFDE antenna at the target based on the location of the target as ascertained by the targeting system; and integrating at least at portion of the radar transmitter or the at least one radar antenna within, at least a portion of the RFDE transmitter or the at least one RFDE antenna.

To the accomplishment of the foregoing and related; ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
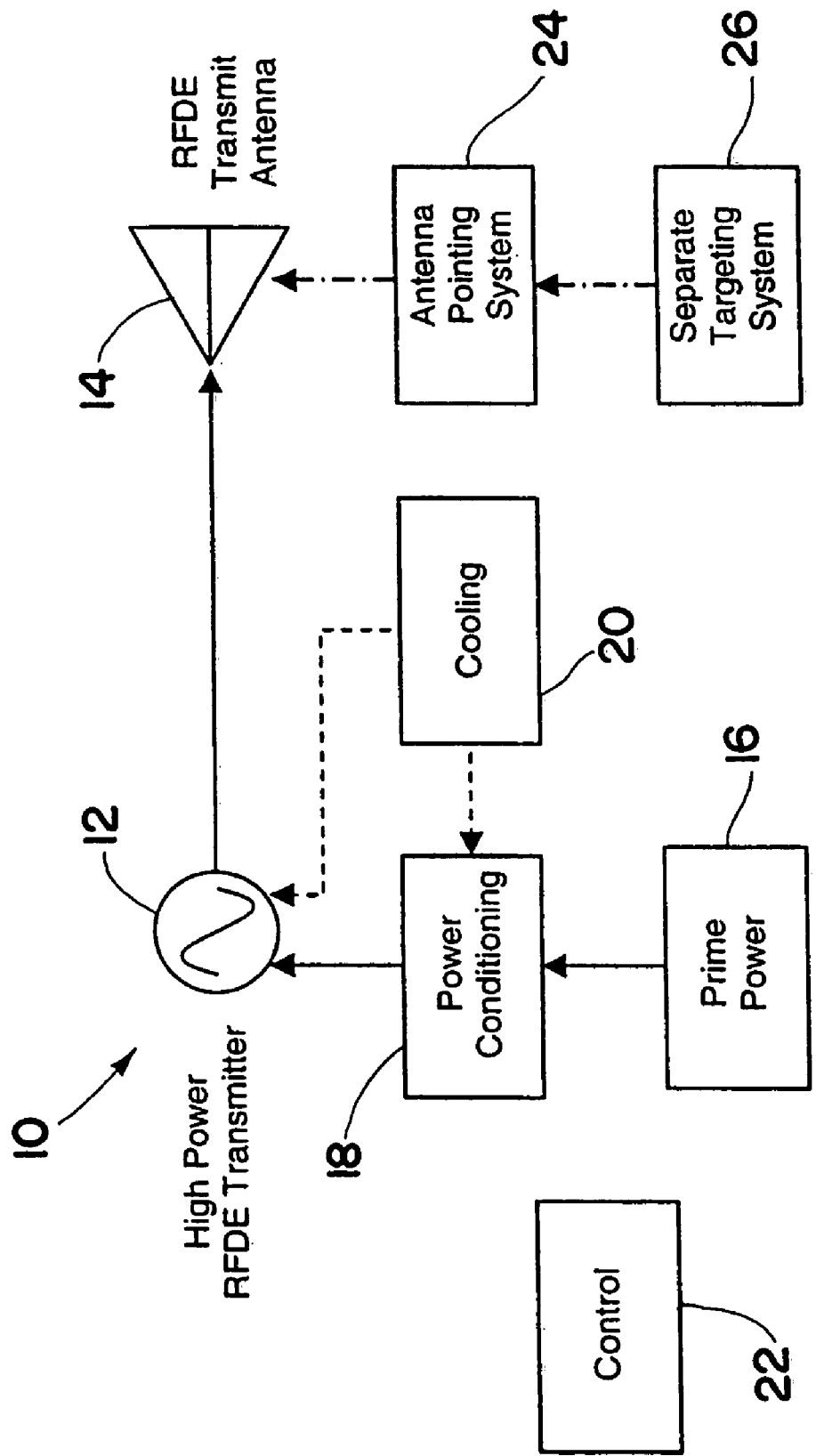
FIG. 1 is a block diagram of a conventional RFDE system.

The present invention will now be described with reference to the drawings, in which like reference numerals are provided to refer to like elements throughout.

The RFDE system of the present invention integrates a targeting system, such as a radar targeting, system, into an otherwise conventional RFDE system. There are several ways that the targeting system can be integrated into the RFDE system as explained herein. The particular embodiments described below are meant to be merely exemplary. The present invention contemplates not only the particular embodiments described herein, but any system in which a targeting system is integrated in part or in whole within the RFDE system.

Figure 2:
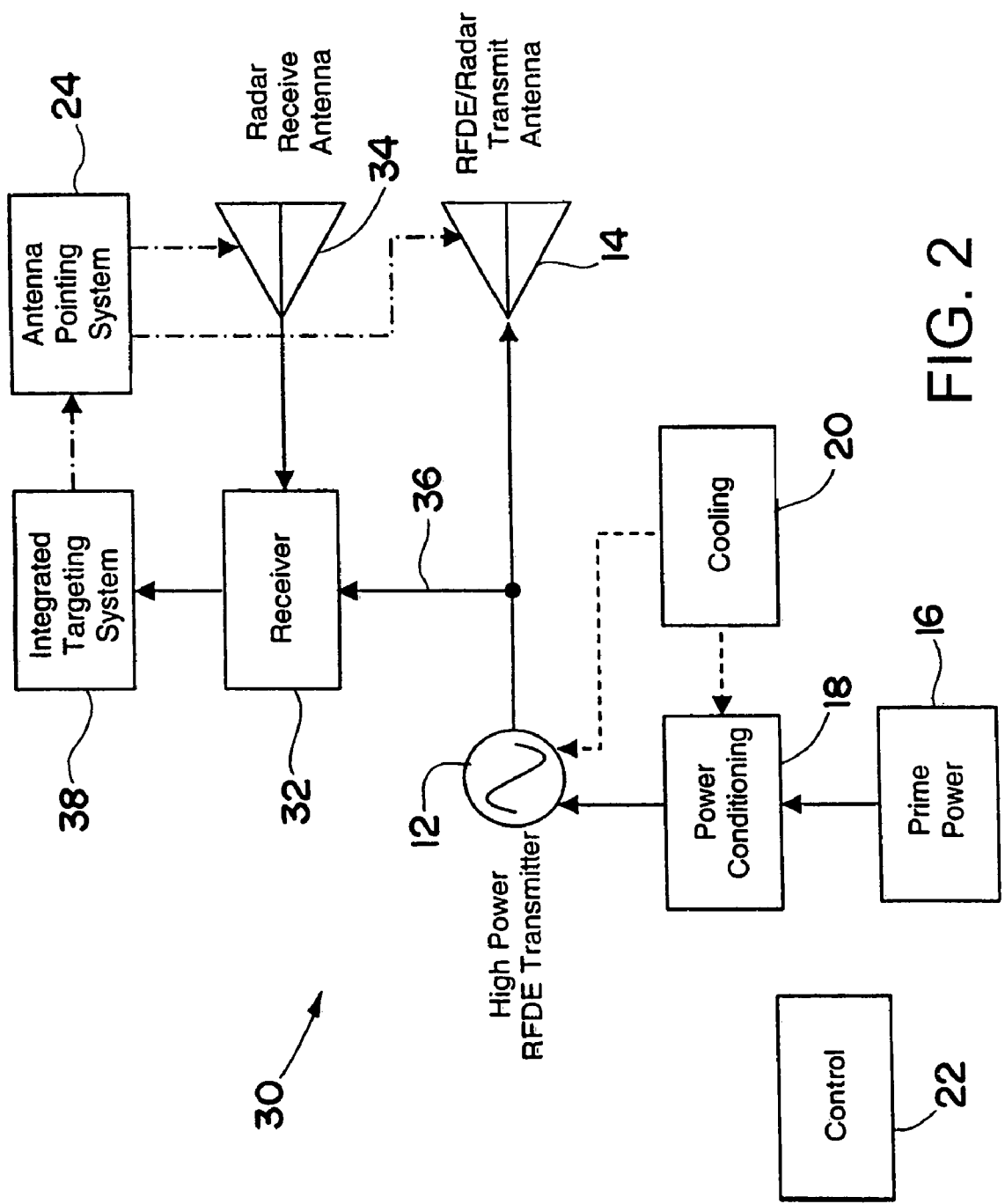
FIG. 2 is a block diagram of a multi-functional RFDE system in accordance with a first embodiment of the present invention.
Figure 3:
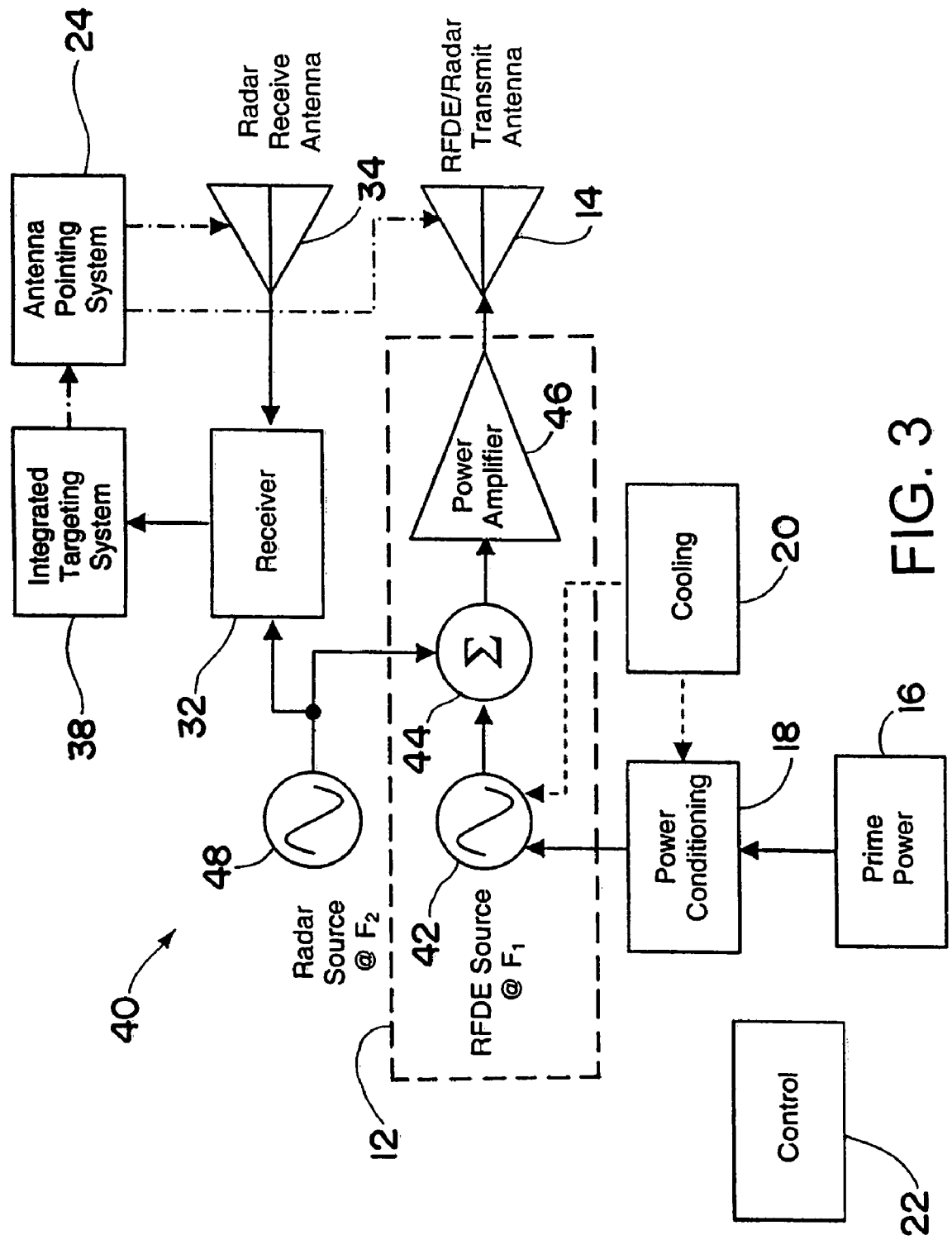
FIG. 3 is a block diagram of a multi-functional RFDE system in accordance with a second embodiment of the present invention.

Referring to FIG. 2, an RFDE system 30 is shown in accordance with an embodiment of the present invention. Since many of the elements of the RFDE system 30 in FIG. 3 are similar to those in the conventional system 10 discussed above with respect to FIG. 1, only the relevant differences with be discussed herein for sake of brevity. In this particular embodiment, a portion of an otherwise conventional RFDE system (notably the high power transmitter 12 and/or the transmit antenna 14) forms part of the targeting system. Specifically, during a targeting mode, the high power RFDE transmitter 12 is controlled by the control block 22 to transmit standard radar tracking signals thru the antenna 14. The radar tracking signals may be any type of conventional radar signal such a pulse or continuous wave radar. The power level of the tracking signals may be a high powered signal, such as the RFDE signal itself, or a relatively low powered signal as more typical in radar tracking applications.

In the embodiment of FIG. 2, a separate radar receiver 32 and radar receive antenna 34 are used in conjunction with the integrated RFDE/radar transmitter 12. In one embodiment, the RFDE high power output beam intended to destroy or disturb a target is transmitted using the RFDE/radar transmitter 12 and antenna 14. The radar receive antenna 34 receives portions of the RFDE output beam reflected by the target back towards the system 30. The radar receiver 32 processes the reflected return signals using conventional techniques in order to identify the location of the target. For example, the radar receiver 32 can be coherently linked to the transmitted RFDE output waveform (represented by line 36) so that Doppler processing can be achieved and the direction and range of the target identified.

The radar receiver 32 provides the target location information to an integrated targeting system block 38 which feeds the location information to the antenna pointing system 24. Such operation allows the antenna 14 to be directed in both search and track radar functions.

As will be appreciated, the RFDE system 30 in FIG. 2, as with the various other embodiments of the invention described herein, can operate in both an RFDE mode and a tracking mode. Both modes may be carried out simultaneously as described above, for example, where the high power electromagnetic energy output waveform of the RFDE system also serves as the radar tracking system transmit signal. Alternatively, the RFDE system 30 may switch between the RFDE mode and the tracking mode using a separate RFDE high power beam and lower power radar transmit signals, respectively. So long as the system 30 switches between the two modes rapidly enough so as not to lose track of the target, operation between RFDE mode and tracking mode may be time-division multiplexed.

Typically the radar transmitter is one of the most expensive portions of a radar tracking system. Therefore, by using the RFDE transmitter 12 and antenna 14 to function as the radar transmitter and antenna for targeting, the cost of the targeting system can be drastically reduced. Also, using the radar return of the RFDE high power beam itself to determine the target location can substantially improve the beam pointing accuracy of the RFDE system 30. By using the RFDE high power beam to determine the location of the target, the power density on target will be maximized when standard radar tracking techniques are employed (e.g., monopulse, continuous scan, etc.).

Those of ordinary skill will appreciate that the RFDE transmitter 12 can be any transmitter suitable for transmitting an RFDE high power beam. For example, the RFDE transmitter 12 may be a single or multiple tube source, or solid state source. Moreover, it will be appreciated that the antenna 14 can be any type of suitable high power antenna which can be mechanically and/or electronically pointed and scanned via the antenna pointing system 24. The transmitter/antenna can also be comprised of an active electronically steered array (AESA), for example, where an array of high power amplifiers/antennas is utilized. The radar receive antennas 34 can be any type of suitable antenna for receiving the radar return signals. As with the antenna 14, the radar receive antenna 34 is mechanically and/or electronically pointed and scanned via the antenna pointing system 24. The antenna pointing system 24 can be a mechanical gimbal or a beam steering computer controlling phase shifters in an electronically steerable array.

FIG. 3 illustrates another embodiment representing how a tracking system can be integrated with an RFDE system. The embodiment of FIG. 3, as with the other embodiments described herein, shares many of the same elements as FIG. 2, and thus again only the relevant differences between the embodiments will be discussed for sake of brevity.

Specifically, FIG. 3 illustrates an RFDE system 40 in which the power amplifier of the tracking system is integrated within the power amplifier of the RFDE system. More particularly, the RFDE transmitter 12 includes a low power RFDE signal source 42 operating at a first frequency and input to an adder 44. The output of the adder 44 is input to a power amplifier 46 which amplifies the output before being radiated by the transmit antenna 14. A low power radar signal source 48 at a second frequency is also input to the adder 44. In addition, the low power radar signal source 48 is input to the radar receiver 32 to provide for coherent processing. The adder 44 thus outputs the combined RFDE signal source and radar signal source to the power amplifier 46. The power amplifier 46 can be any suitable type of amplifier including, for example, an injection locked magnetron, a klystron, a solid-state amplifier, etc., or an array of any of these types of amplifiers in an AESA embodiment.

In the embodiment of FIG. 3, a separate low power radar signal from the signal source 48 is used. This signal is combined with the RFDE signal from the RFDE signal source 42 prior to the combined signal being amplified by the power amplifier 46. The frequencies of the RFDE signal and the radar signal do not have to be at the same frequency. In fact, they can be completely independent of each other within the bandwidth constraints of the power amplifier 46 and the RFDE transmit antenna 14. It will be appreciated that significant isolation can be achieved between the RFDE and radar signals by filtering out the RFDE signal at the receive antenna 34 and/or radar receiver 32.

Again, it will be appreciated that the RFDE system 40 of FIG. 3 may operate in an RFDE mode and a targeting mode. As in the other embodiments described herein, such modes may be carried out simultaneously or in time-multiplexed fashion. In the case where the RFDE signal source 42 and radar signal source 48 are different, one may consider such operation as frequency-multiplexed as will be appreciated.

Figure 4:
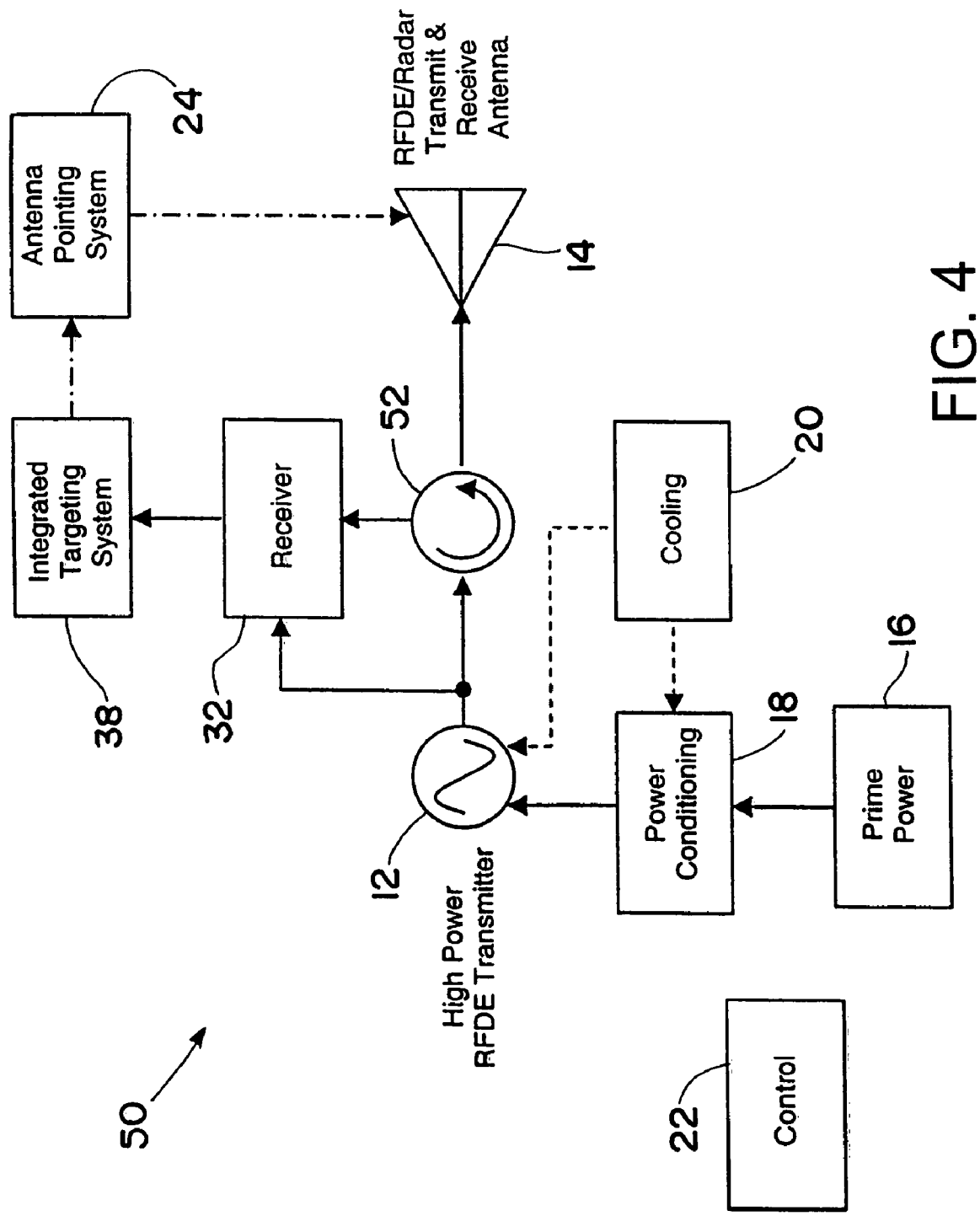
FIG. 4 is a block diagram of a multi-functional RFDE system in accordance with a third embodiment of the present invention.

FIG. 4 illustrates yet another embodiment of the present invention. In this embodiment, the RFDE system 50 integrates the radar receive antenna into the same antenna 14 serving as the RFDE and radar transmit antenna. This is accomplished by means of a high power circulator 52 which routes the RFDE/radar transmit signals from the shared transmitter 12 through to the antenna 14. Reflected signals received by the antenna are routed by the circulator 52 to the receiver 32 for processing. In this example, as in the others discussed herein, the RFDE transmit signal may also be the radar transmit signal. The return signal is received by the same antenna 14 and coupled through the circulator 52 to the receiver 32. The radar system thus can provide target information feedback to the antenna pointing system 24.

The high power circulator 52 can be problematic in that it can be difficult to design a circulator that can handle the typical total power radiated by an RFDE system. Nevertheless, with improvements in materials and technologies such a circulator may someday be commercially feasible. Furthermore, the embodiment of FIG. 4 certainly is very suitable for an AESA system where the output power is broken-up among an array of transmit elements as discussed in more detail below.

In some integrated RFDE/targeting applications it may be desirable only to share the antenna between the RFDE and targeting systems. The RFDE system and the targeting system otherwise operate independently. An example of such an embodiment is shown in FIG. 5.

Figure 5:
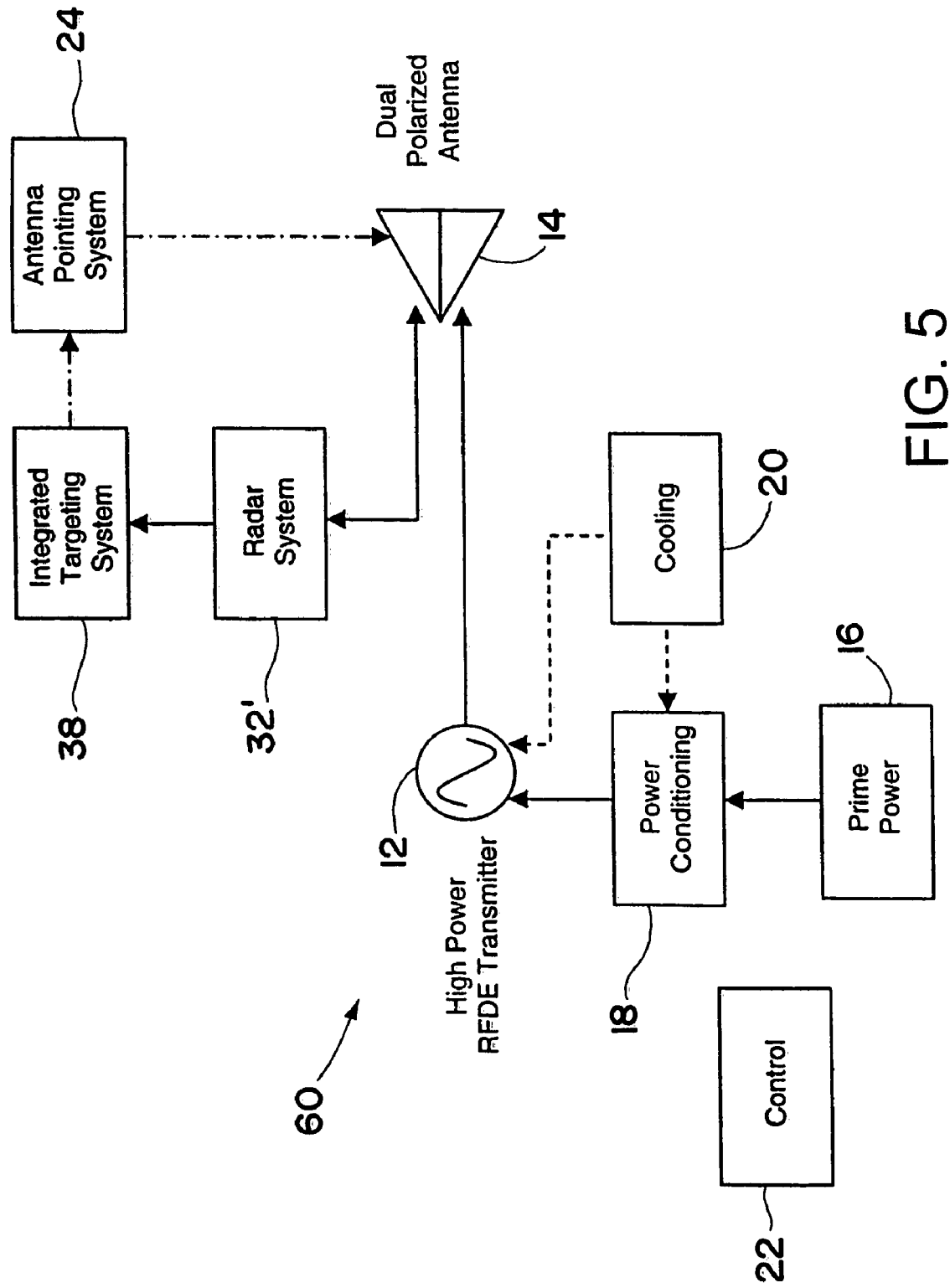
FIG. 5 is a block diagram of a multi-functional RFDE system in accordance with a fourth embodiment of the present invention.

Specifically, the embodiment of FIG. 5 illustrates a radar system 32' which functions essentially independently of the RFDE system 60 with the exception of sharing a dual polarized antenna 14. The RFDE system transmits the RFDE high power beam from the transmitter 12 via the dual polarized antenna 14 using one polarization (e.g., vertical, right hand circular, etc.). The radar system 32', with its own transmitter/receiver, transmits the radar transmit signal via the antenna 14 using the orthogonal polarization (e.g., horizontal, left hand circular, etc.). The reflected radar return signal received by the antenna 14 is processed by the radar system 32' to provide target location information, again using conventional techniques. As in the other embodiments, the location information is provided to the integrated targeting system 38 which provides the information to the antenna pointing system 24. The embodiment of FIG. 5 can be used to provide tracking information and/or is especially suitable for providing range information for the RFDE system.

Figure 6:
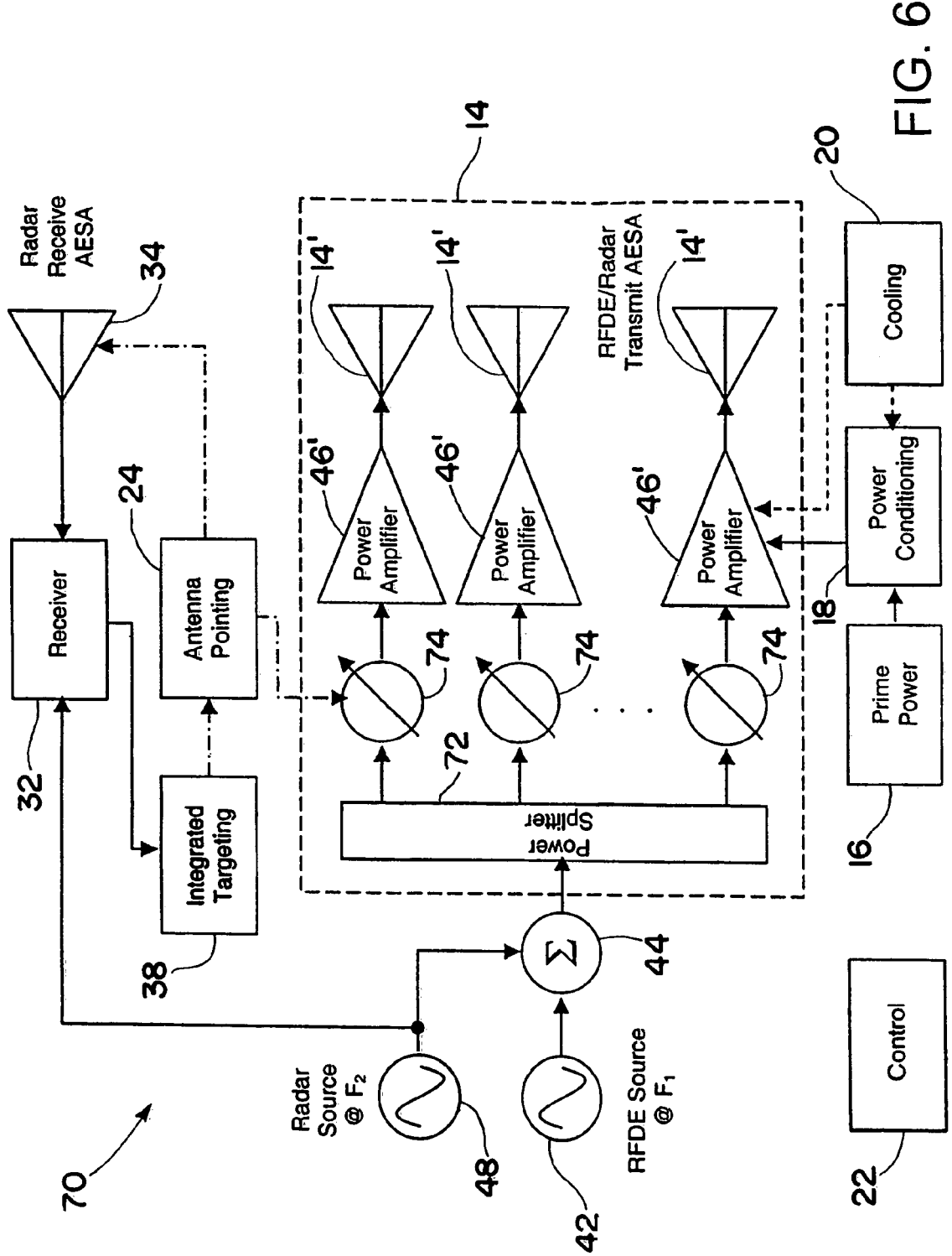
FIG. 6 is a block diagram of a multi-functional RFDE system in accordance with a fifth embodiment of the present invention.

FIG. 6 illustrates an embodiment in which AESAs or phased array antennas may be incorporated within the present invention. The embodiment of FIG. 6 is fundamentally the same as the embodiment of FIG. 3, with the exception that the power amplifier 46 is represented by an array of power amplifiers 46' included with the RFDE/radar transmit AESA antenna 14. The radar receive antenna 34 may similarly comprise an AESA antenna.

As is shown in FIG. 6, the combined signal from the adder 44 is input to a power splitter 72 within the AESA antenna 14. The power splitter 72 separates the signal and provides the split signal to respective phase shifters 74 and power amplifiers 46' corresponding to respective radiator elements 14' in the antenna 14. The antenna pointing system 24 may steer the antenna 14 by adjusting the phase of the phase shifters 74, as will be appreciated.

Continuing to refer to FIG. 6, it will further be appreciated that the radar source 48 and RFDE source 42 can be at different frequencies and still radiate in the same direction. As long as the phase shifters 74 are selected to provide a true time delay (which is fairly common in the art), the antenna 14 may be steered concurrently for both frequencies.

Figure 7:
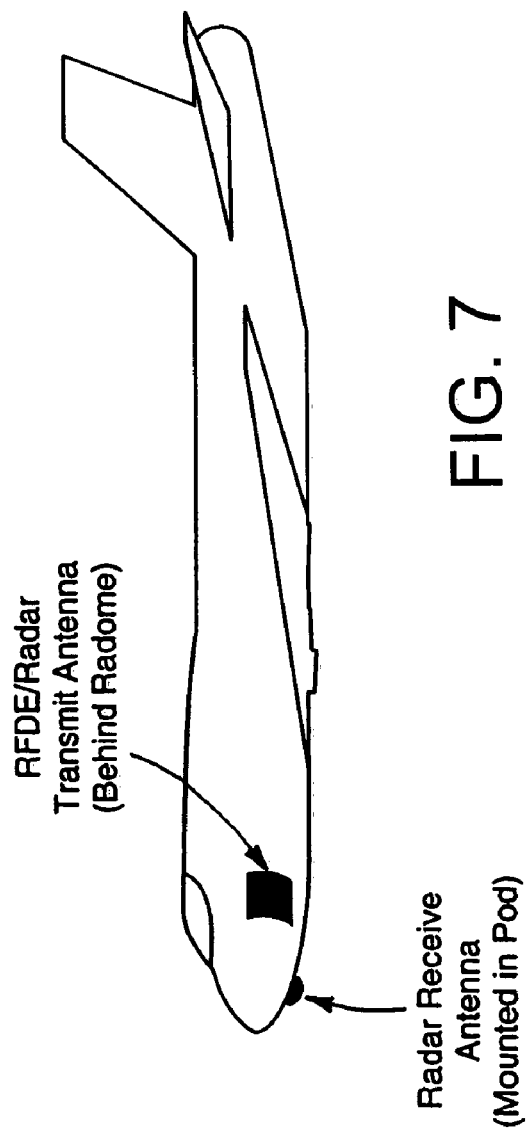
FIG. 7 illustrates a multi-functional RFDE system mounted within an aircraft in accordance with an embodiment of the present invention.

A multifunctional RFDE system of the present invention can be employed on a variety of platforms. For example, FIG. 7 illustrates an embodiment in which the system is employed on an aircraft. The combined RFDE/radar transmitter 12 and antenna 14 (not shown), for example, are mounted to radiate out the side of the aircraft. A pod is then mounted beneath the aircraft, containing the radar receiver 32 and receive antenna 34 (also not shown).

Figure 8:
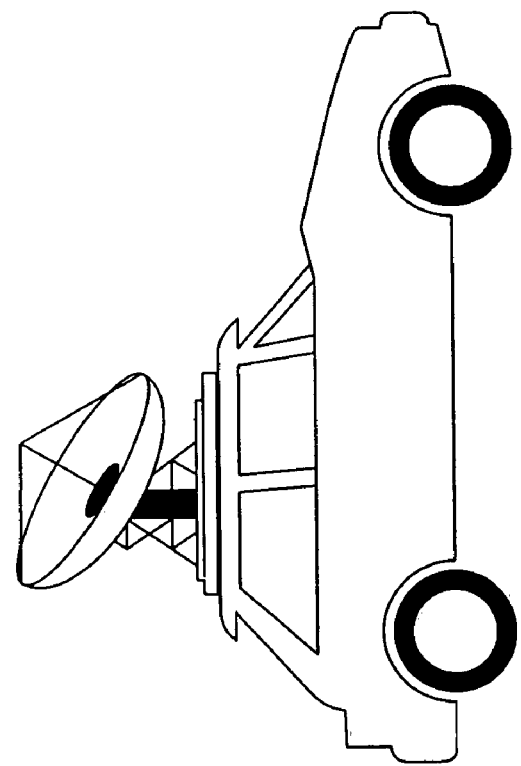
FIG. 8 illustrates a multi-functional RFDE system mounted within a wheeled vehicle in accordance with an embodiment of the present invention.
Figure 9:
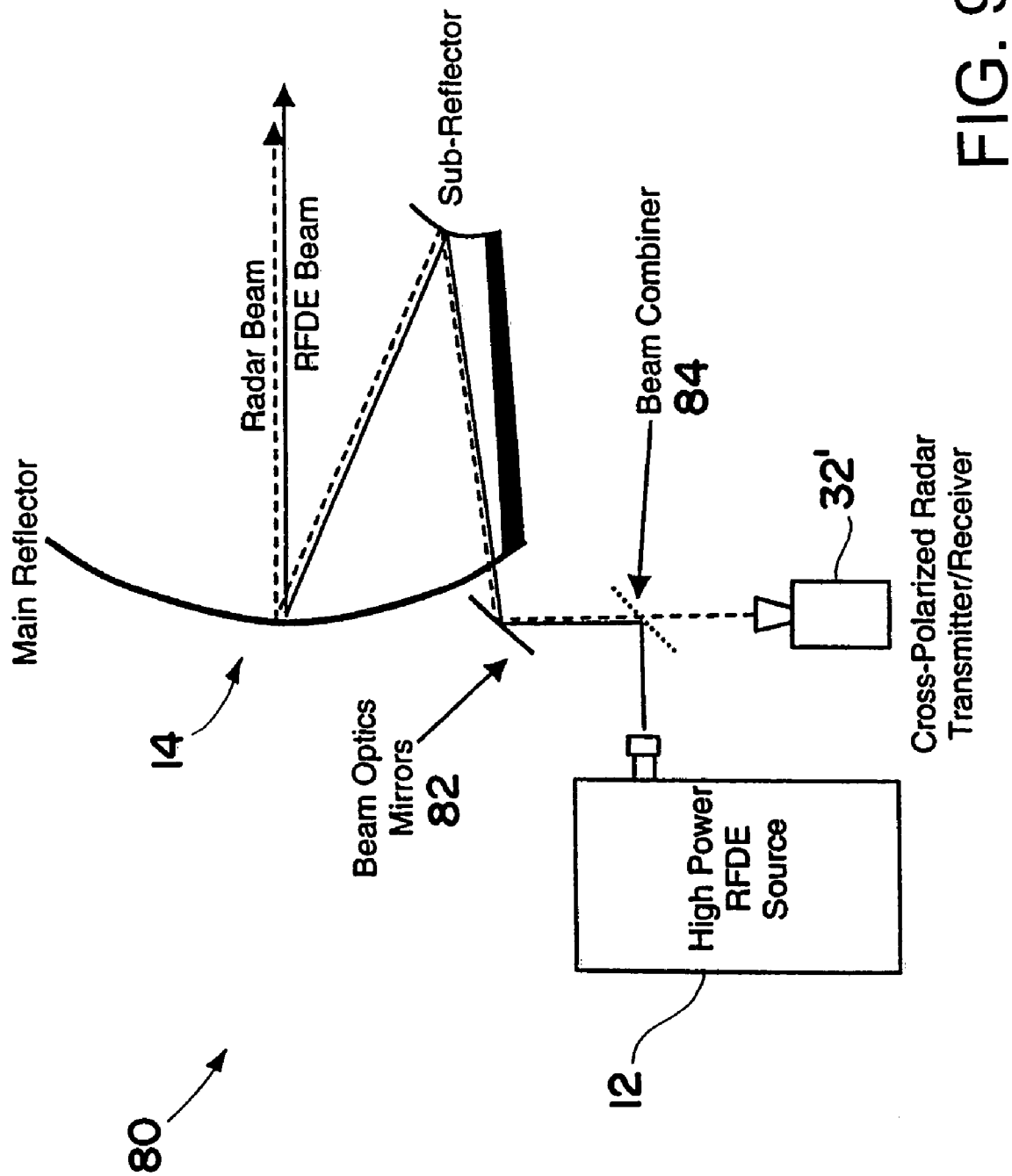
FIG. 9 is a schematic diagram of a multi-functional RFDE system incorporating a reflector-type antenna in accordance with an embodiment of the present invention.

FIG. 8 shows an embodiment in which the RFDE system of the present invention can be employed on a wheeled vehicle. For example, the RFDE and radar systems are mounted in the back of the vehicle and share a common antenna. One possible such system 80 is shown in FIG. 9. A high power RFDE source 12 radiates into a beam transport system comprised of mirrors (e.g., 82) suitable for the frequency of operation. A cross-polarized radar transmit signal from the radar system 32' is then injected into the RFDE beam path by means of a beam combiner/splitter 84. The RFDE and radar transmit signal are then simultaneously transmitted from the common antenna 14, in this embodiment a reflector-type antenna. The radar return signal is received by the antenna 14 and directed back to the cross-polarized radar system 32' via the mirrors 82 and beam combiner/splitter 84.

Although the invention has been shown and described with respect to certain preferred embodiments, it is obvious that equivalents and modifications will occur to others skilled in the art upon the reading and understanding of the specification. For example, although the present invention has been described primarily in the context of a conventional radar based targeting system, other types of radar-like targeting systems which rely on the transmission and return of electromagnetic energy (e.g., laser-based, infrared, etc.) can also be used without departing from the scope of the invention.

The present invention includes all such equivalents and modifications, and is limited only by the scope of the following claims.

What is claimed is:

1. A multi-functional radio frequency directed energy (RFDE) system, comprising:
   an RFDE transmitter and at least one RFDE antenna for directing high power electromagnetic energy towards a target sufficient to cause high energy damage or disruption of the target;
   a targeting system for locating the target, the targeting system including a radar transmitter and at least one radar antenna for transmitting and receiving electromagnetic energy to locate the target; and
   an antenna pointing system for aiming the at least one RFDE antenna at the target based on the location of the target as ascertained by the targeting system,
   wherein at least a portion of the radar transmitter or the at least one radar antenna is integrated within at least a portion of the RFDE transmitter or the at least one RFDE antenna to provide simultaneous transmission of the high power electromagnetic energy and the electromagnetic energy to locate the target.

2. The multi-functional RFDE system of claim 1, wherein the at least one radar antenna is embodied at least partially within the at least one RFDE antenna.

3. The multi-functional RFDE system of claim 1, wherein the radar transmitter is embodied at least partially within the RFDE transmitter.

4. The multi-functional RFDE system of claim 3, wherein the radar transmitter and the RFDE transmitter comprise a common RF power amplifier.

5. The multi-functional RFDE system of claim 4, wherein the electromagnetic energy for locating the target is at a first frequency, and the high power electromagnetic energy is at a second frequency different from the first.

6. The multi-functional RFDE system of claim 1, wherein the at least one radar antenna functions to transmit the electromagnetic energy for locating the target, and the at least one radar antenna is embodied at least partially in the at least one RFDE antenna.

7. The multi-functional RFDE system of claim 6, wherein the at least one radar antenna includes a first radar antenna that functions to transmit the electromagnetic energy for locating the target and to transmit the high power electromagnetic energy, and a second radar antenna that functions to receive the electromagnetic energy reflected from the target in order to locate the target.

8. The multi-functional RFDE system of claim 7, wherein the first radar antenna comprises a multi-element phased array.

9. The multi-functional RFDE system of claim 6, wherein the at least one radar antenna that functions to transmit the electromagnetic energy for locating the target also functions to receive the electromagnetic energy reflected from the target in order to locate the target.

10. The multi-functional RFDE system of claim 9, wherein the at least one radar antenna comprises a dual-polarized antenna.

11. The multi-functional RFDE system of claim 1, wherein the system comprises a beam combiner for combining the high power electromagnetic energy with the electromagnetic energy for locating the target in a path between the RFDE transmitter and the RFDE antenna.

12. The multi-functional RFDE system of claim 1, wherein the system is configured for operation in a mobile vehicle.

13. The multi-functional RFDE system of claim 12, wherein the mobile vehicle is a wheeled-vehicle.

14. The multi-functional RFDE system of claim 12, wherein the mobile vehicle is an aircraft.

15. A method of operating a multi-functional radio frequency directed energy (RFDE) system, comprising the steps of:
   utilizing an RFDE transmitter and at least one RFDE antenna to direct high power electromagnetic energy towards a target sufficient to cause high energy damage or disruption of the target;
   utilizing a targeting system to locate the target, the targeting system including a radar transmitter and at least one radar antenna for transmitting and receiving electromagnetic energy to locate the target;
   aiming the at least one RFDE antenna at the target based on the location of the target as ascertained by the targeting system; and
   integrating at least a portion of the radar transmitter or the at least one radar antenna within at least a portion of the RFDE transmitter or the at least one RFDE antenna to provide simultaneous transmission of the high power electromagnetic energy and the electromagnetic energy to locate the target.

16. The method of claim 15, wherein the at least one radar antenna is embodied at least partially within the at least one RFDE antenna.

17. The method of claim 15, wherein the radar transmitter is embodied at least partially within the RFDE transmitter.

18. The method of claim 17, wherein the radar transmitter and the RFDE transmitter comprise a common RF power amplifier.

19. The method of claim 18, wherein the electromagnetic energy for locating the target is at a first frequency, and the high power electromagnetic energy is at a second frequency different from the first.

20. The method of claim 15, wherein the at least one radar antenna functions to transmit the electromagnetic energy for locating the target, and the at least one radar antenna is embodied at least partially in the at least one RFDE antenna.

21. A multi-functional radio frequency directed energy (RFDE) system, comprising:
   an RFDE transmitter and at least one RFDE antenna for directing high power electromagnetic energy towards a target sufficient to cause high energy damage or disruption of the target;
   a targeting system for locating the target, the targeting system including a radar transmitter and at least one radar antenna for transmitting and receiving electromagnetic energy to locate the target; and
   an antenna pointing system for aiming the at least one RFDE antenna at the target based on the location of the target as ascertained by the targeting system,
   wherein at least a portion of the radar transmitter or the at least one radar antenna is integrated within at least a portion of the RFDE transmitter or the at least one RFDE antenna and the high power electromagnetic energy is used as the electromagnetic energy to locate the target.

22. A method of operating a multi-functional radio frequency directed energy (RFDE) system, comprising the steps of:
- utilizing an RFDE transmitter and at least one RFDE antenna to direct high power electromagnetic energy towards a target sufficient to cause high energy damage or disruption of the target;
- utilizing a targeting system to locate the target, the targeting system including a radar transmitter and at least one radar antenna for transmitting and receiving electromagnetic energy to locate the target;
- aiming the at least one RFDE antenna at the target based on the location of the target as ascertained by the targeting system; and
- integrating at least a portion of the radar transmitter or the at least one radar antenna within at least a portion of the RFDE transmitter or the at least one RFDE antenna,
- wherein the high power electromagnetic energy is used as the electromagnetic energy to locate the target.

* * * * *

UNITED STATES PATENT AND TRADEMARK OFFICE
CERTIFICATE OF CORRECTION

PATENT NO. : 7,629,918 B2
APPLICATION NO. : 11/300876
DATED : December 8, 2009
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 230 days.

Signed and Sealed this

Second Day of November, 2010

David J. Kappos
*Director of the United States Patent and Trademark Office*